(12) United States Patent
Preuss (10) Patent No.: US 10,434,993 B2
(45) Date of Patent: Oct. 8, 2019

(54) TRAILER LEG SECURING DEVICES AND SYSTEM

(71) Applicant: John Preuss, Avon, IN (US)

(72) Inventor: John Preuss, Avon, IN (US)

( * ) Notice: Subject to any disclaimer, the term of this patent is extended or adjusted under 35 U.S.C. 154(b) by 98 days.

(21) Appl. No.: 15/369,055

(22) Filed: Dec. 5, 2016

(65) Prior Publication Data

US 2017/0232941 A1    Aug. 17, 2017

Related U.S. Application Data

(63) Continuation of application No. 14/789,463, filed on Jul. 1, 2015, now Pat. No. 9,527,483.

(51) Int. Cl.
*B60S 9/04*    (2006.01)
*B60S 9/08*    (2006.01)
*B60R 25/00*    (2013.01)

(52) U.S. Cl.
CPC ............ *B60S 9/04* (2013.01); *B60R 25/001* (2013.01); *B60S 9/08* (2013.01)

(58) Field of Classification Search
CPC ................................. B60R 25/001; B60S 9/04
USPC ........................................................ 280/475
See application file for complete search history.

(56) References Cited

U.S. PATENT DOCUMENTS

| 4,122,693 | A | * | 10/1978 | Barr | E05B 67/38 70/229 |
|---|---|---|---|---|---|
| 4,300,373 | A | * | 11/1981 | Camos | E21B 33/03 166/113 |
| 6,588,239 | B1 | * | 7/2003 | Johansson | B60D 1/60 280/507 |
| 6,634,843 | B1 | * | 10/2003 | Tarnow | F16B 21/12 403/155 |
| 8,491,009 | B2 | * | 7/2013 | Shelton | B60P 3/36 254/418 |
| 8,807,609 | B2 | * | 8/2014 | Stallbaumer | E05B 67/36 292/1 |
| 2014/0116536 | A1 | * | 5/2014 | Resendiz | F16K 35/10 137/377 |

FOREIGN PATENT DOCUMENTS

DE    102012214414 A1 *    2/2014    ............... B60S 9/08
EP    2698296    8/2012

* cited by examiner

*Primary Examiner* — Joseph M Rocca
*Assistant Examiner* — Felicia L. Brittman
(74) *Attorney, Agent, or Firm* — C. John Brannon; Brannon Sowers & Cracraft PC (57) ABSTRACT

Devices and systems for securing and locking tractor trailer support legs in the down position are described herein. A securing pin passing through one of the support legs of a trailer while in the down position prevents the trailer legs from being raised. The pin can be locked in place such that only authorized users may remove the pin, raise the support legs, and move the trailer. A variety of kits for retrofitting existing trailers with securing devices are also provided.

8 Claims, 9 Drawing Sheets

TRAILER LEG SECURING DEVICES AND SYSTEM

CROSS REFERENCE TO RELATED APPLICATIONS

This application is a continuation of and claims priority to U.S. Pat. No. 9,527,483 filed on Jul. 1, 2015, which claims priority to U.S. Provisional Patent Application Ser. No. 61/998,531 filed on Jul. 1, 2014.

BACKGROUND

Figure 1:
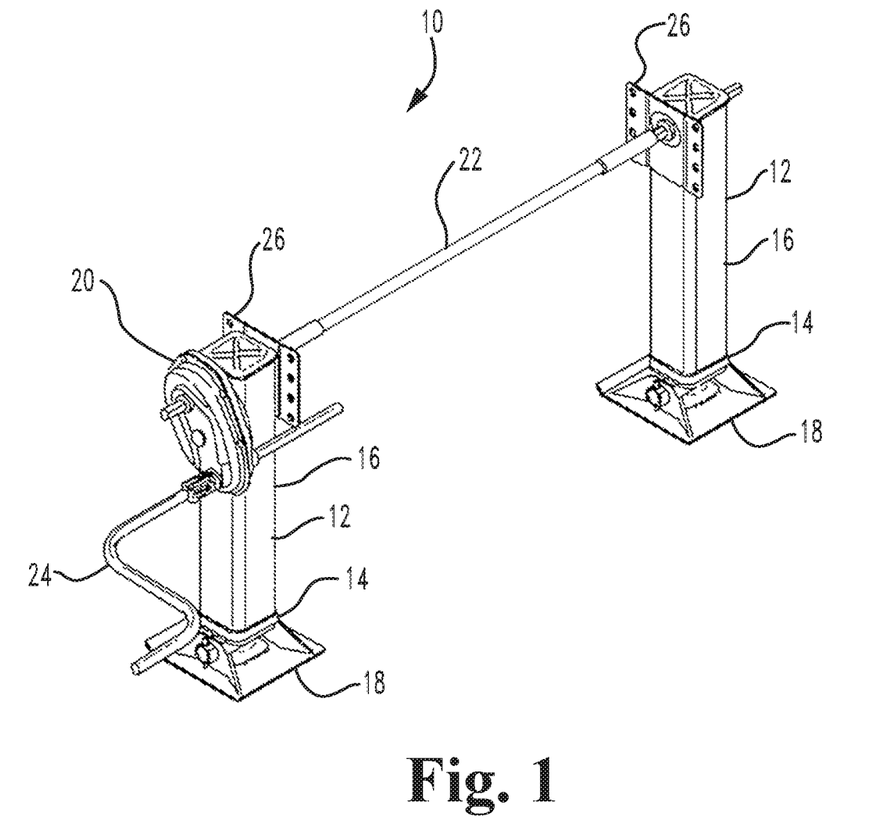
FIG. 1 is a perspective view of trailer leg gear.

Most trailers used in combination with large trucks utilize some variation of support legs or "landing gear" to keep the trailer level when not engaged with a truck and so as to allow the trailer to be easily attached and detached from a truck. These legs come in a variety of styles, but most have the overall basic form as shown in FIG. 1, where a conventional landing gear 10 for a semi-trailer is shown. The landing gear 10 is used to support a semi-trailer when the semi-trailer is disconnected from a tractor. The landing gear 10 is designed to expand and contract vertically. In expansion, the landing gear 10 lifts the front of a semi-trailer so that it can be disconnected from the tractor, and thereafter supports the front of the semi-trailer when the tractor departs. In contraction, the landing gear 10 lowers the front of the semi-trailer to enable connection to a tractor, and, once connected, to further gain ground clearance so the semi-trailer can be pulled by the tractor without the supports striking the ground.

The landing gear 10 typically comprises a pair of spaced arms 12, each having a mounting bracket 26 for securing the landing gear to a frame of a semi-trailer (not shown). Each arm 12 comprises a hollow tube 16 within which is a leg 14 that is geared to extend from and retract into the hollow tube 16. Each leg has a foot pad 18 that supports the landing gear 10 on the ground. A gearbox 20 may be mounted to one of the arms to control the extension and retraction of both legs by way of a cross drive shaft 22 extending between the arms 12. The gearbox 20 is manually driven by a crank handle 24. In other examples, the legs may be raised and lowered using pneumatic, hydraulic, or electrical power rather than with a hand crank.

When a trailer is parked without an attached truck it is vulnerably to theft by simply attaching another truck to the unattended trailer and driving away. Several different methods have been used to help secure unattached trailers, most of which involve securing or otherwise disabling the attachment point of the trailer (i.e., the kingpin) or removing or disabling the raising and lowering mechanism of the legs. Such methods are generally easy to defeat for a thief who comes prepared with cutting tools and/or replacement hardware to remove any securing devices and/or enable the trailer legs.

DESCRIPTION

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
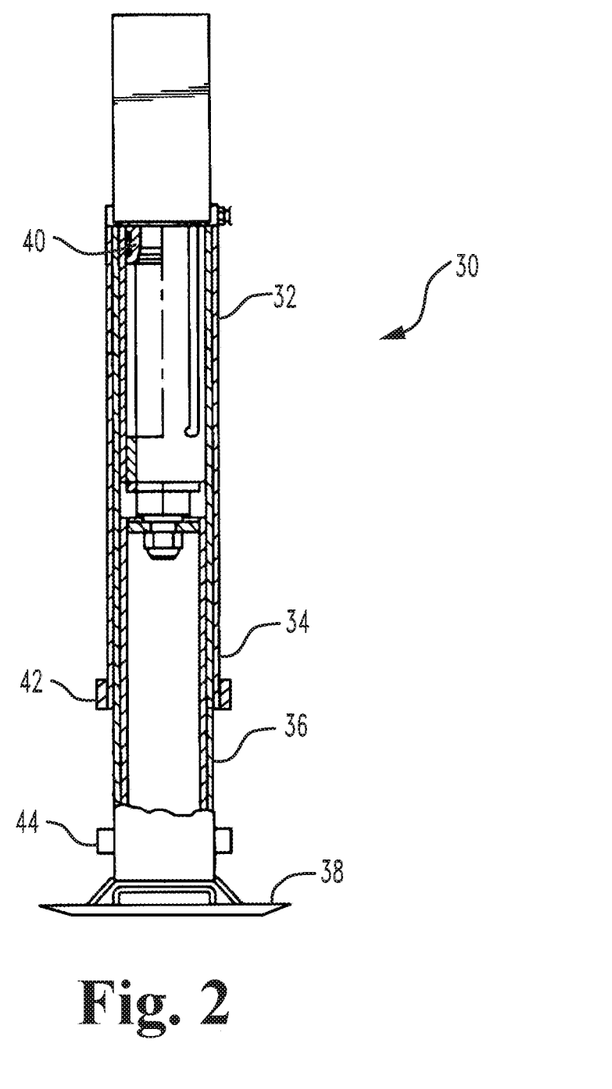
FIG. 2 is a partial cut away view of a trailer leg.

FIG. 2 shows a partial cut away view of a single trailer support leg 30. The disclosed invention of the present application may be used with a wide variety of designs, may be adapted for use with either or both support legs, and may be used with legs which employ different raising and lowering means (manual cranks, pneumatics, electrical motors, etc.). The disclosed invention may also be used on any type of trailer such as flat beds, tankers, box trailers, and the like. The following examples will be described with reference to a single leg support shown unattached from a trailer for illustrative purposes only.

The support leg 30 comprises a vertical leg portion 32 having an outer portion 34 and an inner portion 36 capable of sliding in and out of the outer portion 34 when moving between the raised and lowered positions. In this example, the leg portions 34-36 are shown as box shaped, but in other examples they may be tubular. The leg 32 is attached to a foot pad 38 by a pin 44 which allows the foot pad 38 to pivot when the trailer is parked on an uneven surface. The leg is raised and lowered using a driving means 40, the exact nature of which may vary as previously described. When the support leg is moved to the raised position, the inner portion 36 slides into the outer portion 34 until the pin 44 contacts the lower edge 42 of the outer portion which acts as a stop.

Figure 3:
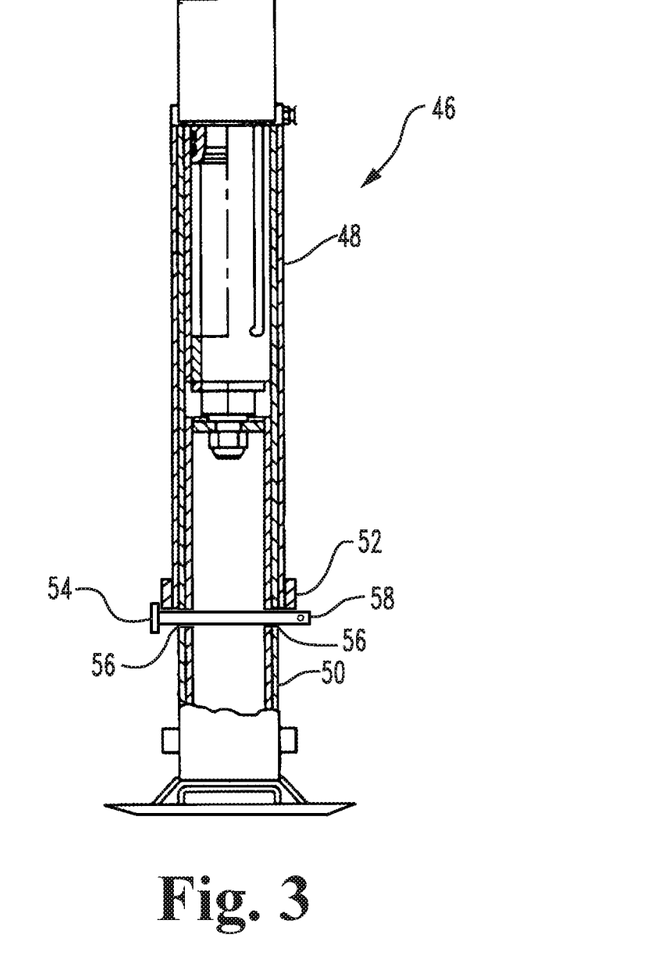
FIG. 3 is a partial cut away view of a trailer leg securing device according to one embodiment of the claimed invention.

One example of a trailer leg securing device assembly according to the disclosed invention is shown in FIG. 3. In this particular example, a trailer leg 46 having an outer portion 48 and an inner portion 50. A securing pin 54 passes through holes 56 made in the inner portion 50 of the trailer leg. When an attempt is made to raise the trailer legs by raising the inner leg portion 50 into the outer leg portion 48, the securing pin 54 contacts the lower edge 52 of the outer portion 48 and prevents the trailer leg 46 from being raised. The securing pin 54 further includes an attachment point 58 (in this example a through hole perpendicular to a longitudinal axis of the securing pin 54) which allows the securing pin 54 to be locked into place. Examples of methods for locking the securing pin 54 will be described in greater detail in other examples.

The holes 56 passing through the inner portion 50 of the trailer leg may be formed using a drill, torch, or other suitable cutting means and may be made during the manufacture of the trailer leg or be added to existing trailer legs. The hole is positioned and sized such that it does not interfere with the raising and lowering of the trailer leg when the pin is removed, but prevents the leg from being raised when the pin is secured in place. Exact placement and sizing of the holes will vary depending on a particular leg's design and the method which is used to raise and lower it. When the pin is secured in place, the trailer leg is prevented from being raised and the trailer effectively disabled from being towed behind a truck as the trailer legs would still be in contact with the ground.

Figure 4:
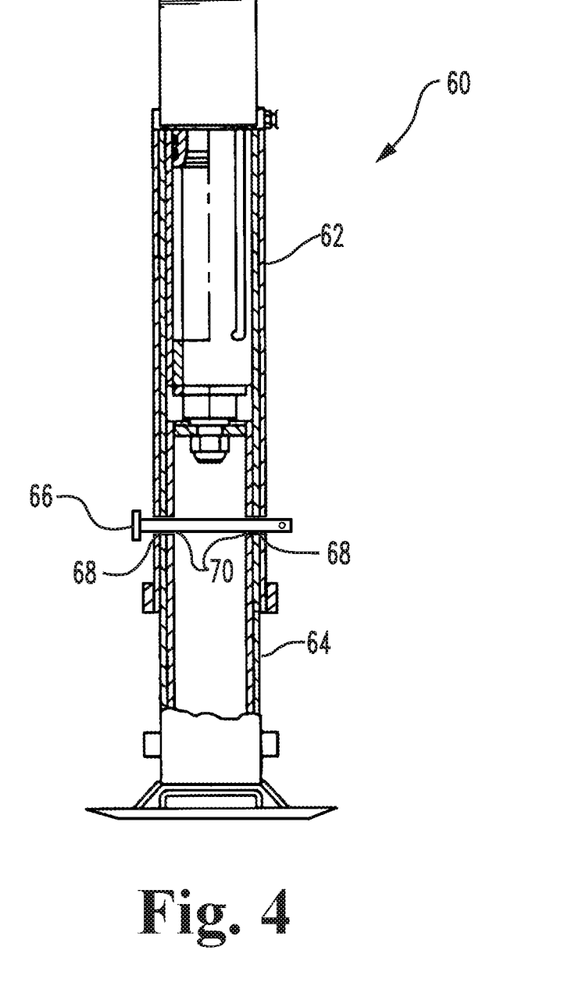
FIG. 4 is a partial cut away view of a trailer leg securing device according to another embodiment of the claimed invention.

In the example shown in FIG. 4, a trailer leg 60 having an outer leg portion 62 and an inner leg portion 64 is secured in the lowered position using a securing pin 66 similar to the previous example. In this particular example, the securing pin 66 passes through holes in both the inner leg 64 and the outer leg 62. A pair of inner leg holes 70 are sized and positioned such that they align with a pair of outer leg holes 68 when the leg 60 is in the lowered position. The securing pin 66 may then be inserted through the holes 68, 70 thereby locking the inner and outer leg portions together and preventing the trailer leg 60 from being raised. As with the previous example, the exact positioning and sizing of the holes 68, 70 will vary according to a specific leg design.

Figure 5:
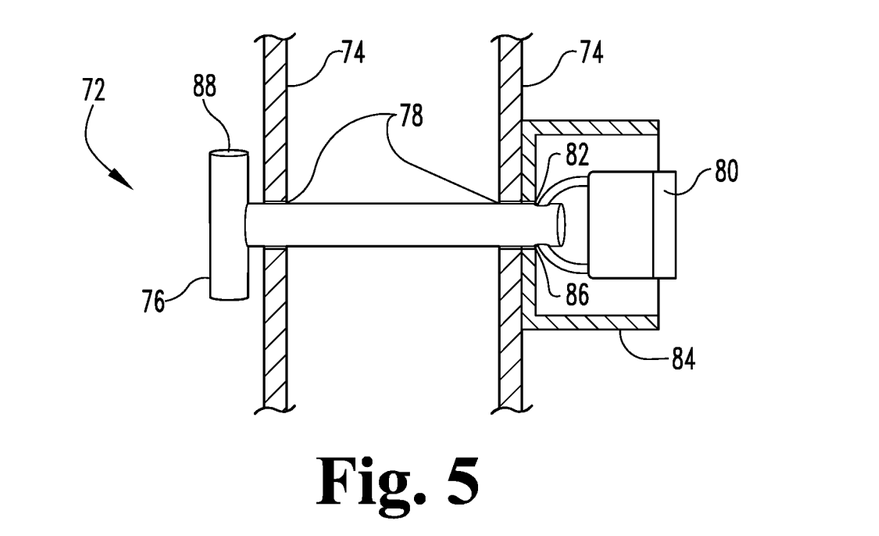
FIG. 5 is a partial cut away side view of a trailer leg securing device according to one embodiment of the claimed invention.
Figure 6:
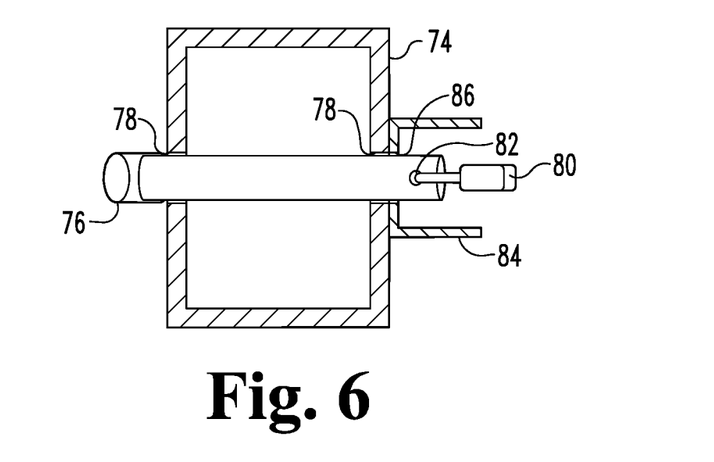
FIG. 6 is a partial cut away top plan view of the trailer leg securing device shown in FIG. 5.

FIG. 5 is a partial cut away view of an assembly comprising a trailer leg securing device 72 according to one embodiment of the disclosed invention. FIG. 6 is a top plan view of the device shown in FIG. 5. In this example, the securing device 72 comprises a securing pin 76 having an attachment point 82 and an enlarged portion 88, a protective cowling 84, and a locking device 80. The pin 76 is made from a suitably hard material such as steel. The protective cowling is also made from a suitably hard material such as steel and includes an opening 86 sized such that securing pin 76 may pass therethrough. The locking device 80 may be a commercially available padlock which may be opened with a key or numerical combination. In other examples, the lock may be a more complex device which is operable using biometrics, radio frequencies, and the like.

In this particular example, the trailer leg 74 is secured in the lowered position by passing the securing pin 76 through openings 78 in the leg 74. The openings are sized and positioned such that trailer leg is operable when the securing pin is removed and locked in the lowered position when the securing pin is engaged. The pin 76 is inserted through the openings 78 in the leg 74 until the enlarged portion 88 contacts the leg 74. The enlarged portion 88 is sized and shaped so that it may not pass through the leg openings 78. In this example, the enlarged portion is a cross member forming a T with the pin, but in other examples it may be a ball, a ring, or other suitable shape as desired. Once the pin is inserted through the leg, the protective cowling 84 is placed over the securing pin 76 by passing the pin through an opening 86 in the cowling. The lock is then secured to the attachment point 82 of the pin 76, thereby locking the pin in place and preventing the trailer leg from being raised.

In this example, the cowling is a U shaped bracket having a hole sufficiently sized and placed so that the securing pin can pass therethrough. The trailer leg 74 is locked in the down position when said securing pin 76 is inserted in said opening 78, the locking device 80 is locked on the securing pin 76, and the two sides of the protective cowling 84 extend outwardly from the trailer leg 74 and flank the locking device 80. The cowling is sized such that the lock cannot be easily removed such as using bolt cutters, a grinding wheel, or a hammer. With the cowl in place, the cowl my first be removed or destroyed before the lock itself may be attacked. Such activity will attract attention and slow down a would-be thief.

Figure 7:
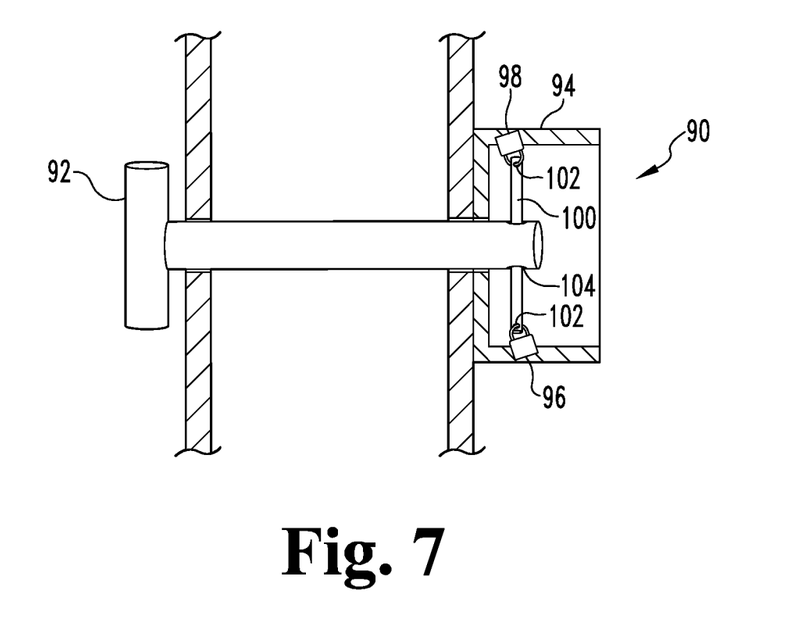
FIG. 7 is a partial cut away side view of a trailer leg securing device according to another embodiment of the claimed invention.

A variation of the disclosed invention is shown in FIG. 7. In this particular example, a securing device 90 comprises a securing pin 92 having an attachment point 104 and a protective cowl 94 similar to those previously described. The securing device in this example further comprises a cross member 100 having two attachment points 102 and two different locks 96, 98. The cross member 100 is passed through the attachment point 104 of the securing pin 92 when the pin is engaged with the trailer leg. A lock 96, 98 is then secured to each attachment point 102 of the cross member 100. The cross member may be sized such that it is compatible with a securing pin such as the one previously described with respect to the example shown in FIGS. 5-6. The cross member 100 may be removed from the securing pin 92, and the securing pin 92 subsequently removed and the trailer leg unlocked, when either one of the locks 96, 98 is removed. This securing device 90 allows either one of two different drivers to both secure and unlock a particular trailer. For example, trailers used as part of a fleet may be equipped with such a device where individual drivers have keys to one of the locks and yard workers have keys to the other lock, thereby allowing yard workers to unlock and move any trailer but restricting individual truck drivers to only certain trailers which their specific keys unlock.

Figure 8:
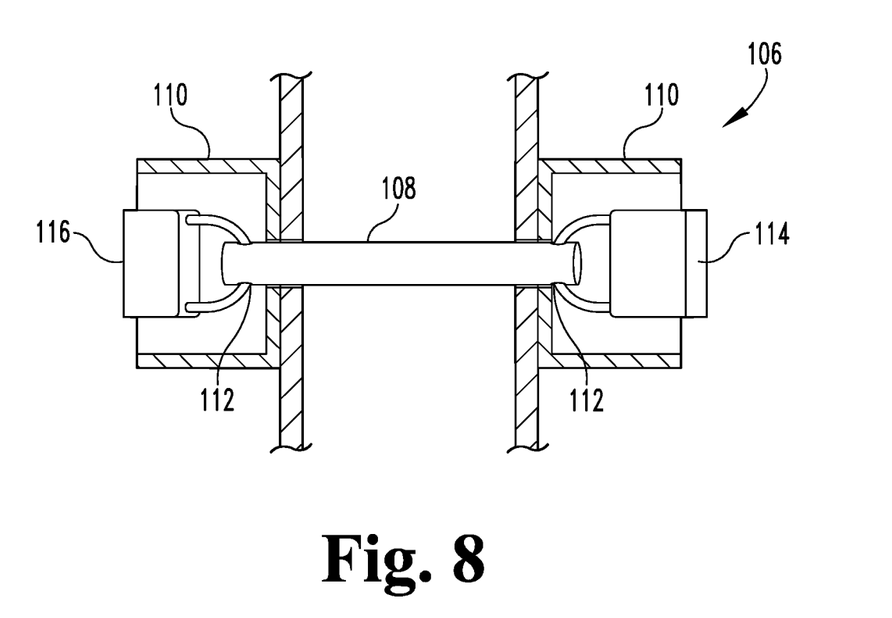
FIG. 8 is a partial cut away top plan view of the trailer leg securing device shown in FIG. 7.

A different dual lock system is shown in FIG. 8. In this particular example, a securing pin 108 is provided with two attachment points 112 disposed at opposite ends of the pin. Two cowls 110 similar to those previously described and two different locks 114, 116 are also provided. The system works in a similar manner to that described with respect to FIG. 7, but in this example a lock 114, 116 protected by a cowl 110 is secured at each end of the securing pin 108. Having two different locks allows different drivers to access the trailer and also allows certain drivers to have access to certain trailers while retaining the ability of a single person to have access to all trailers without having to carry multiple keys.

Figure 9:
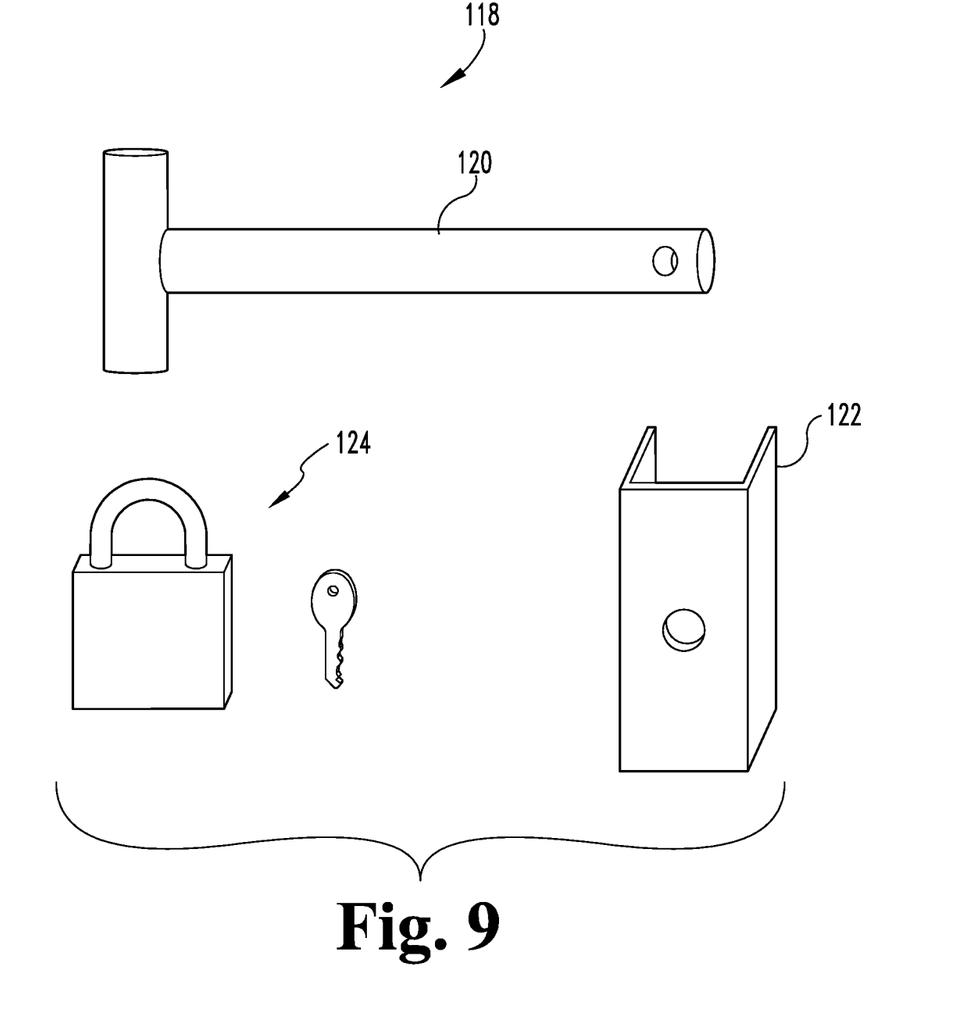
FIG. 9 is a trailer leg securing kit according to one embodiment of the disclosed invention.
Figure 10:
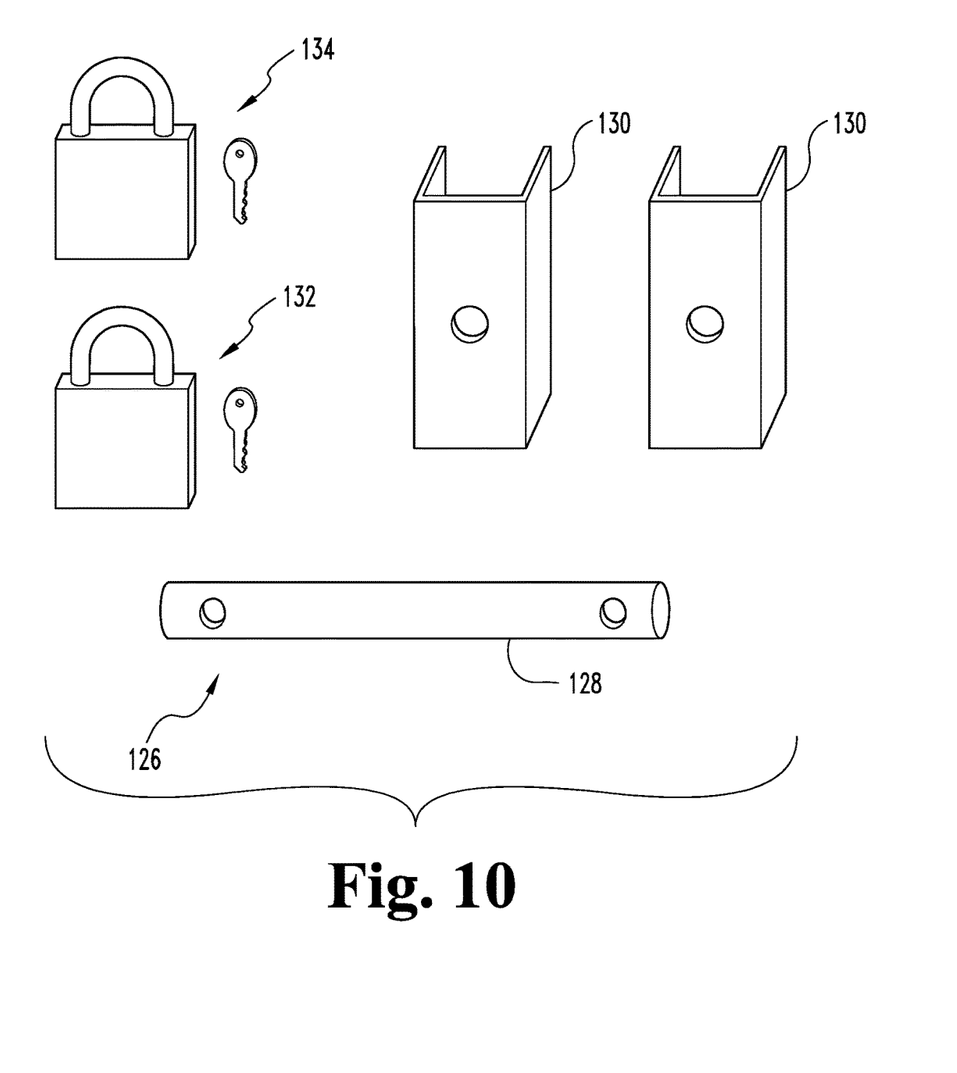
FIG. 10 is a trailer leg securing kit according to another embodiment of the disclosed invention.
Figure 11:
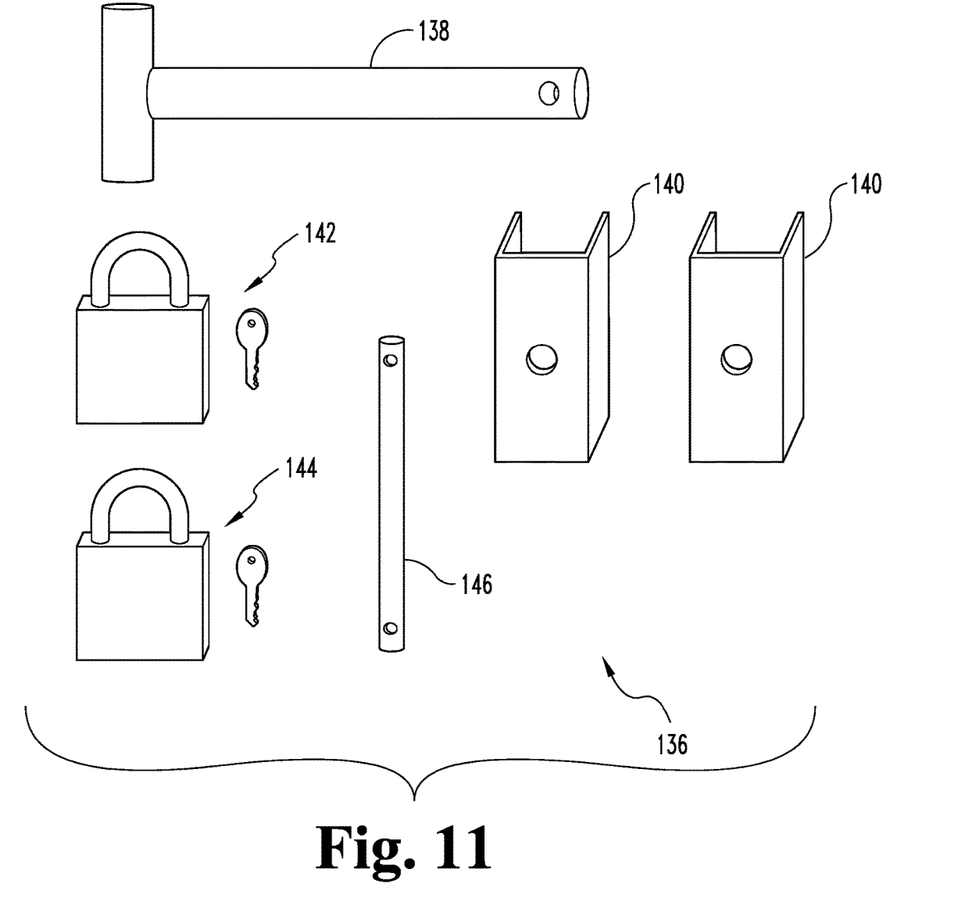
FIG. 11 is a trailer leg securing kit according to still another embodiment of the disclosed invention.

FIGS. 9-11 show trailer leg securing kits according to different embodiments of the disclosed invention. In all of these examples, the kids may be adapted to work with a particular style, make, or manufacture of trailer support legs as desired. FIG. 9 shows a kit 118 comprising a securing pin 120, a lock and key 124, and a protective cowl 122. The kit functions in a similar fashion to the example described in FIGS. 5-6. The kit 126 shown in FIG. 10 includes a securing bar 128 having two attachment points, two protective cowls 130, and two lock and key sets 132, 134. The locks may be identical or different. The kit functions in a similar fashion to the example described in FIG. 8. FIG. 11 shows a kit 136 having a securing pin 138, a cross member 146, two protective cowls and two lock and key sets 142, 144. The locks may be identical or different. The kit functions in a similar fashion to the example described in FIG. 7.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A kit for a trailer leg securing assembly, comprising:
   a securing pin having at least one attachment point, wherein the at least one attachment point is a through hole perpendicular to a longitudinal axis of the securing pin;
   a protective cowling having two sides disposed at a distance from one another and an opening sized and configured such that the at least one attachment point of said securing pin can pass therethrough; and
   a locking device sized and configured to lock on said securing pin at the at least one attachment point;
   wherein the locking device is disposed between the two sides of the protective cowling when locked on said securing pin;
   wherein said securing pin is sized and configured to be inserted through a pair of openings in the trailer leg;
   wherein the trailer leg is locked in a down position when said securing pin is inserted through the pair of openings, the locking device is locked on the securing pin, the protective cowling contacts the trailer leg, and the two sides of the protective cowling extend outwardly from the trailer leg and flank the locking device.

2. The kit of claim 1, wherein said securing pin comprises an enlarged portion disposed opposite the at least one attachment point which is incapable of passing through said opening in the trailer leg.

3. The kit of claim 1, wherein said locking device is a padlock.

4. A method of securing a trailer by preventing the trailer support legs from being raised from the lowered position, comprising:
   providing a securing pin having an enlarged portion and at least one attachment point disposed opposite said enlarged portion, wherein the at least one attachment point is a through hole perpendicular to a longitudinal axis of the securing pin;
   providing a u-shaped protective cowling having two sides disposed at a distance from one another and an opening sized and configured such that the at least one attachment point of the securing pin can be inserted therethrough;
   providing a locking device sized and configured to lock on the securing pin at the at least one attachment point;
   inserting the securing pin into an opening in the trailer leg until the enlarged portion contacts the trailer leg;
   inserting the at least one attachment point of the securing pin through the opening of the protective cowling until the protective cowling contacts the trailer leg and the two sides of the protective cowling extend outwardly from the trailer leg;
   attaching and locking the locking device to the securing pin at the at least one attachment point; and
   flanking the locking device with the two sides of the protective cowling.

5. A device for securing a trailer leg of a trailer in the lowered position, comprising:
   a securing pin having an enlarged portion and at least one attachment point disposed opposite said enlarged portion, wherein the at least one attachment point is a through hole perpendicular to a longitudinal axis of the securing pin;
   a u-shaped protective cowling having an opening sized and configured such that the at least one attachment point of the securing pin can be inserted therethrough; and
   a locking device sized and configured to lock on the securing pin at the at least one attachment point when the securing pin is inserted through the protective cowling,
   wherein when the locking device is locked on the securing pin the protective cowling contacts the trailer leg and the two sides of the protective cowling extend outwardly from the trailer leg and flank the locking device.

6. The device of claim 5, wherein the locking device is a key-operated padlock.

7. The device of claim 5, wherein the enlarged portion of said securing pin is sized and configured so as to be incapable of passing through an opening in the trailer leg; and
   wherein the at least one attachment point is sized and configured so as to be capable of passing through said opening in the trailer leg.

8. The device of claim 5, wherein the locking device is at least partially disposed between the sides of the u-shaped protective cowling when locked on the securing pin.

* * * * *